United States Patent [19]
Tucker

[11] Patent Number: 4,894,902

[45] Date of Patent: Jan. 23, 1990

[54] WINDOW OPERATOR ASSEMBLY METHOD

[75] Inventor: Daniel G. Tucker, Elysian, Minn.

[73] Assignee: Truth Incorporated, Owatonna, Minn.

[21] Appl. No.: 341,715

[22] Filed: Apr. 21, 1989

Related U.S. Application Data

[62] Division of Ser. No. 196,378, May 20, 1988, Pat. No. 4,840,075.

[51] Int. Cl.[4] .......... B23P 11/00

[52] U.S. Cl. .......... 29/437; 29/445; 29/509

[58] Field of Search .......... 29/437, 444, 445, 509; 49/339, 341; 74/89.14, 425; 403/153, 154, 161, 162, 163; 411/501, 504, 505, 506, 507, 544

[56] References Cited

U.S. PATENT DOCUMENTS

| | | | |
|---|---|---|---|
| 2,241,513 | 5/1941 | Hagstrom | 49/342 X |
| 2,570,429 | 10/1951 | Cooper | 29/517 |
| 2,635,485 | 4/1953 | Gravenstine et al. | 49/342 |
| 2,696,018 | 12/1954 | Hollister | 29/509 |
| 2,713,806 | 7/1955 | Dodge | 403/152 X |
| 2,921,819 | 1/1960 | Rifkin | 29/523 |
| 3,169,418 | 2/1965 | Borowsky | 29/509 |
| 3,357,084 | 12/1967 | Colautti et al. | 29/DIG. 18 X |
| 4,202,243 | 5/1980 | Leonhardt | 29/524.1 X |
| 4,305,228 | 12/1981 | Nelson | 49/342 X |

*Primary Examiner*—Mark Rosenbaum
*Assistant Examiner*—Frances Chin
*Attorney, Agent, or Firm*—Wood, Dalton, Phillips, Mason & Rowe

[57] ABSTRACT

A window operator has a base with an upstanding pivot pin having a bushing thereon and at least one component pivotally mounted on the bushing. The components are held in assembled relation by a captured washer and the washer has an outer annular portion formed to provide a controlled clearance. A method of forming the window operator comprises assembly of the pivot pin, bushing and pivotal component to a mounting base and the capturing of a washer beneath the head of the pivot pin and with an inner annular part of the washer engaging an upper edge of the bushing which extends beyond the upper surface of the pivotal component, followed by a deformation of the outer annular part of the washer to compress the pivotal component between the washer and the base followed by release of the compressive force to permit spring-back of the outer annular part of the washer to provide the controlled clearance.

5 Claims, 2 Drawing Sheets

FIG. 1
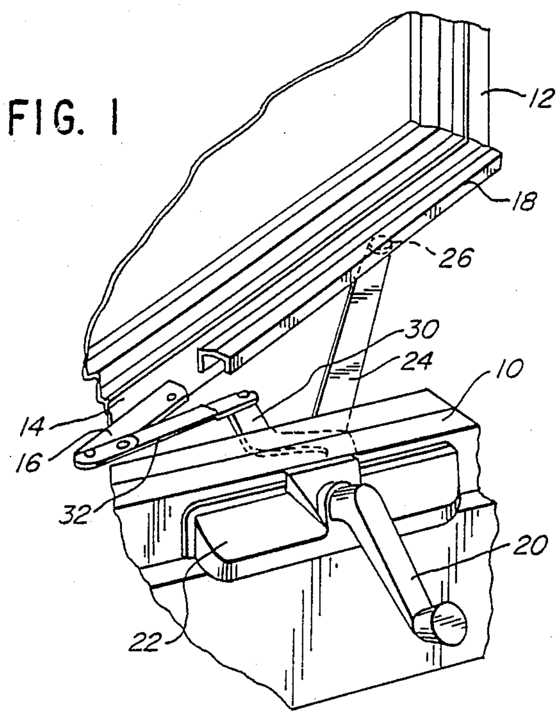
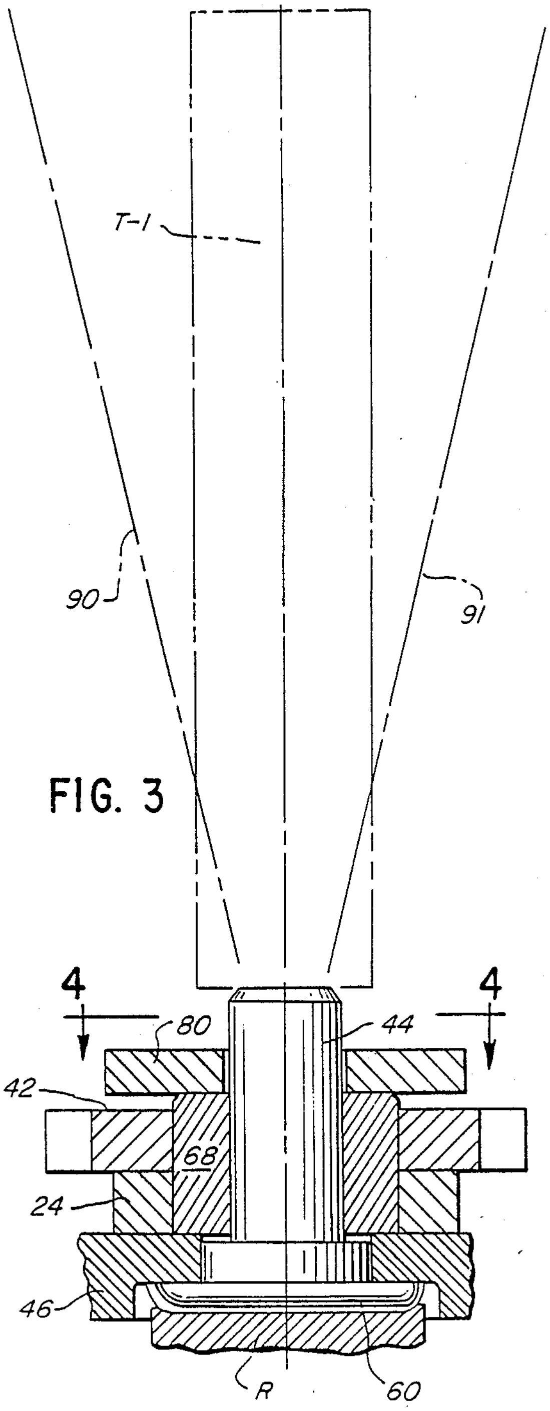
FIG. 3
FIG. 4
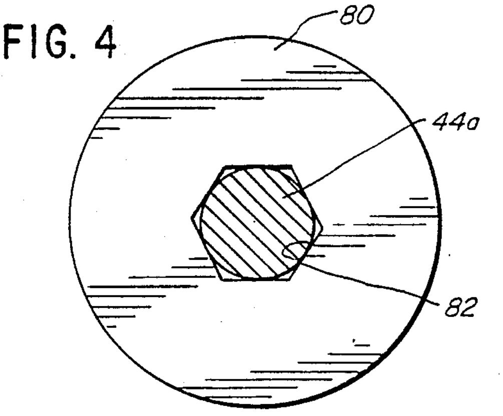
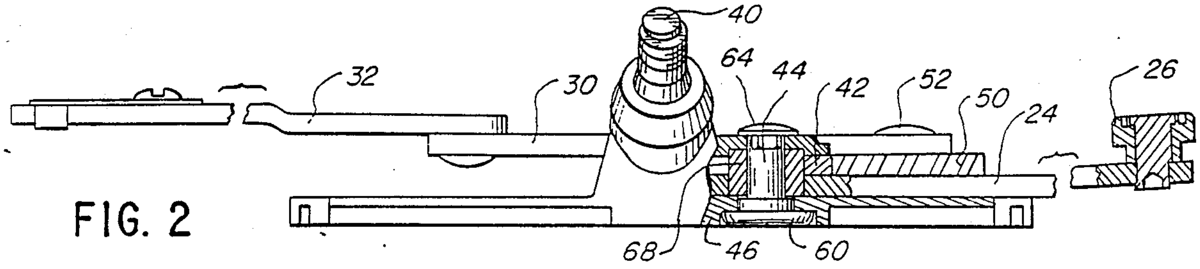
FIG. 2

WINDOW OPERATOR ASSEMBLY METHOD

DESCRIPTION

CROSS-REFERENCE TO RELATED APPLICATION

This is a division of application Ser. No. 196,378, filed May 20, 1988 now U.S. Pat. No. 4,840,075

FIELD OF THE INVENTION

This invention pertains to a window operator and a method for making the window operator wherein elements of the operator having relatively large tolerances are assembled with a controlled clearance for good pivoting action with minimal play and by a method which easily removes the build-up of tolerances of the components by deformation of a retaining washer with the elasticity of the washer being relied upon to provide the controlled clearance.

BACKGROUND OF THE INVENTION

A popular type of window operator for a swinging window, such as a casement window, has one or plural members, such as an arm and a gear, mounted for oscillatory movement on a pivot pin. Typically, the gear and arm are formed from sheet steel, with the sheet steel having a substantial amount of tolerance and, without take-up of the total amount of tolerance that may exist, the components can be relatively loosely mounted to have an undesirable amount of play axially of the pivot axis.

One known method for taking-up the tolerance and providing a controlled clearance is disclosed in a co-pending application of Douglas A. Nolte et al., Ser. No. 070,411, filed July 7, 1987 and owned by the assignee of this application. In the method disclosed therein, an arm and a gear are captured between a base and a washer and rotatably mounted on a bushing fitted onto a pivot pin which holds the components together. The bushing is of hardened metal and is pressed into the base to have an exposed end thereof at a controlled distance above the stacked components whereby a washer can be placed against the end of the bushing to provide a controlled clearance for the arm and gear positioned between the washer and the base.

The Borowsky Pat. No. 3,169,418 discloses possible achieving of controlled clearance of components by controlled deformation of a flange or head of a pivot pin which holds the components in assembled relation.

The Colautti et al. Pat. No. 3,357,084 discloses an assembly method for components by displacing the head portion of a rivet and, thereafter, the rivet head springs back to provide what is described as a controlled amount of tolerance.

The known prior art does not disclose a window operator wherein the conventionally utilized washer, which holds components in assembled relation with the base of the window operator, is shaped during assembly by a method which provides for deformation of an annular outer part of the washer for compressive engagement with the components and relies upon elasticity of the washer whereby the washer springs back from engagement with one of the components to provide controlled clearance for limiting axial play of the components.

SUMMARY OF THE INVENTION

A primary feature of the invention is to provide a new and improved window operator having at least one component mounted for pivotal movement relative to a pivot pin and with the component having a controlled clearance for limited axial play by having a washer associated with the pin which holds the component in assembled relation with a base and with an annular outer part of the washer offset from the plane of the washer a controlled distance to provide the controlled clearance.

Another feature of the invention is to provide a new and improved method for assembling the components of the window operator as defined in the preceding paragraph wherein a bushing surrounds the pivot pin and pivotally mounts at least one component with an end of the bushing extending beyond an upper surface of the component for engagement with an inner annular part of the washer and a compressive force is exerted on an outer annular part of the washer beyond the bushing to press the outer annular part of the washer into engagement with the top surface of the component whereby, after release of the compressive force, the elasticity of the washer enables spring-back of the annular outer part to provide controlled clearance for the component.

An object of the invention is to provide a new and improved window operator and a method of assembly thereof.

Another object of the invention is to provide a window operator comprising a base, a pivot pin upstanding from said base, a bushing mounted on said pivot pin, a first member pivotally mounted on said bushing, a second member pivotally mounted on said bushing, said members being superimposed one on the other with the bushing having an end extending thereabove, a metal washer positioned against said bushing end and extending radially therebeyond to have an annular part thereof overlie part of the uppermost member, and said annular part of the washer being deformed downwardly from the plane of the washer a predetermined amount to provide a controlled clearance for the members.

Still another object of the invention relates to a method of assembling pivotal components of a window operator comprising, assembling a pair of members on a bushing mounted on a pivot pin extending from a base and with a metal washer on the pivot pin adjacent an end thereof, compressing said washer against the bushing while at the same time forming a head on the end of the pivot pin, and thereafter forming an annular outer part of the washer down around the bushing and against one of said members to take up all clearances between the base and said members, whereby after release of the forming force the elasticity of the washer enables spring-back of the annular outer part thereof to provide controlled clearance for pivoting of said members.

DESCRIPTION OF THE DRAWINGS

FIG. 1 is a fragmentary perspective view of a window operator embodying the invention shown in association with a casement window;

FIG. 2 is a fragmentary section of the window operator with a cover and handle removed and with parts shown broken away;

FIG. 3 is a fragmentary sectional view showing one step in assembly of the window operator;

FIG. 4 is a section, taken generally along the line 4—4 in FIG. 3;

DESCRIPTION OF THE PREFERRED EMBODIMENT OF ARTICLE AND METHOD OF ASSEMBLY

Figure 5:
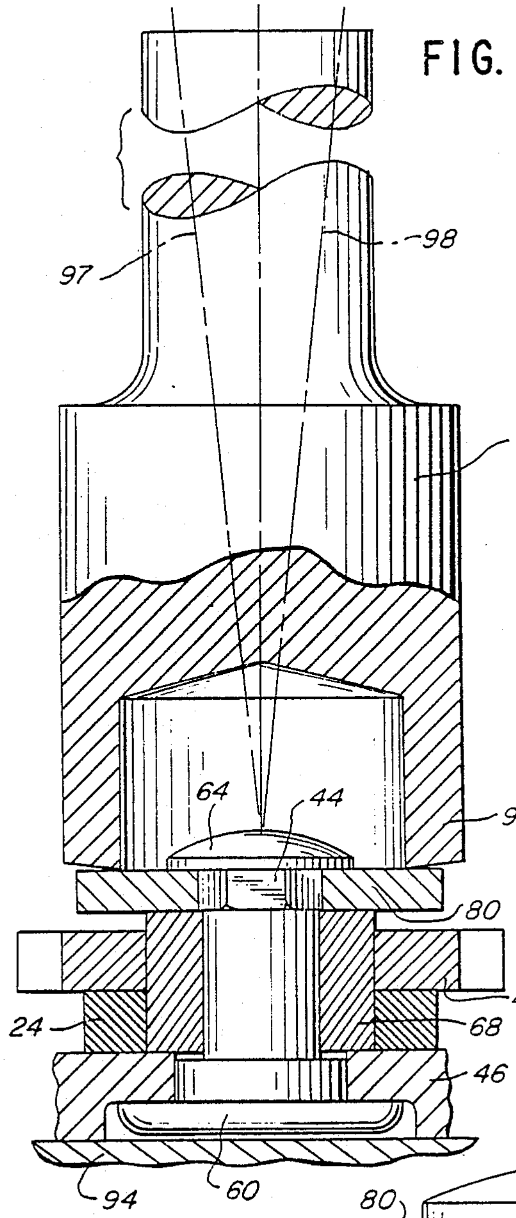
FIG. 5 is a view, similar to FIG. 3, illustrating a step in the assembly method.

The window operator is shown generally in FIG. 1 in association with a casement window wherein a part of the window frame includes a sill 10 with a sash 12 supported relative to the frame by hinges along a left vertical edge (not shown). A lower rail 14 of the sash mounts a bracket 16 and a guide track 18.

The window operator has a handle 20 extending outwardly of a cover 22. The handle 20 is rotatable for operation of gearing, to be described, for operation of a first arm 24 having a member 26 at an end thereof shaped for coaction with the guide track 18 and with this first arm functioning as a push arm for exerting a push on the sash in opening of, the window and for pulling-in on the sash in closing of the window.

A second arm 30 is connected by a link 32 to the bracket 16 and functions to pull the hinge side of the sash to its open position in opening of the window and exerting a push on the hinge side of the sash in closing of the window.

The mechanism of the window operator for converting rotation or the handle 20 to movement of the first arm 24 and second arm 30 is shown generally in FIG. 2. The handle 20 fits onto a rotatable shaft 40 having a worm gear (not shown) which meshes with a gear 42 which is mounted for rotation and more particularly for oscillatory movement relative to a pivot pin 44 fixed to a base 46 of the window operator. The coaction between the worm on the shaft 40 and the gear 42 is the same as shown in the Nolte et al application previously referred to and the disclosure thereof is incorporated herein by reference. The first arm 24 is also mounted for pivotal movement about the pivot pin 44 and has a gear 50 mounted thereon which meshes with and "walks-around" the axis defined by the pivot pin 44 when the handle 20 is rotated. The gear 50 is fixed against rotation to the first arm 24 by a rivet 52 and this rivet also secures an end of the second arm 30 to the gear 50 and first arm 24 whereby the movement of the gear 50 about the gear 42 causes rotation of the arm 24 and also substantially linear movement of the second arm 30.

Figure 7:
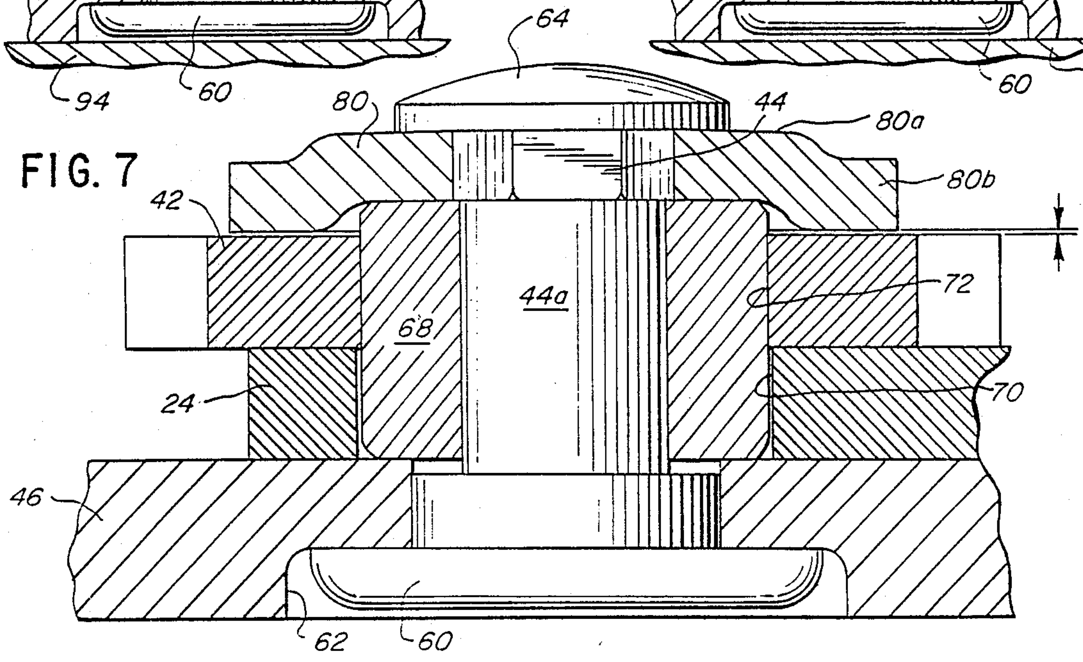
FIG. 7 is an enlarged fragmentary view of the completed assembly of components.

The association of the components with the pivot pin 44 is shown particularly in FIG. 7 which shows the structure after completion of the product manufacture, with the pivot pin 44 having a lower head 60 fitted in a recess 62 in the base 46 and having a stem 44*a* extending to an upper shaped head 64. A bushing 68 is positioned on the stem of the pivot pin and provides a bearing for pivotal mounting of the arm 24 and gear 42 by openings 70 and 72 therein, respectively. A washer 80, shown in flat planar shape in FIG. 4, has a multi-sided opening 82 to lock onto the upper part of the pivot pin stem 44*a* which is forced into conformity with the washer opening during forming of the upper head 64 to hold the washer against rotation. The washer has an inner annular part 80*a*, which is planar and captured by the shaped head 64, and an outer annular part 80*b* overlying the gear 42, which has been deformed from the plane of the washer to provide the controlled clearance for the arm 24 and gear 42, as more particularly described hereinafter.

Figure 6:
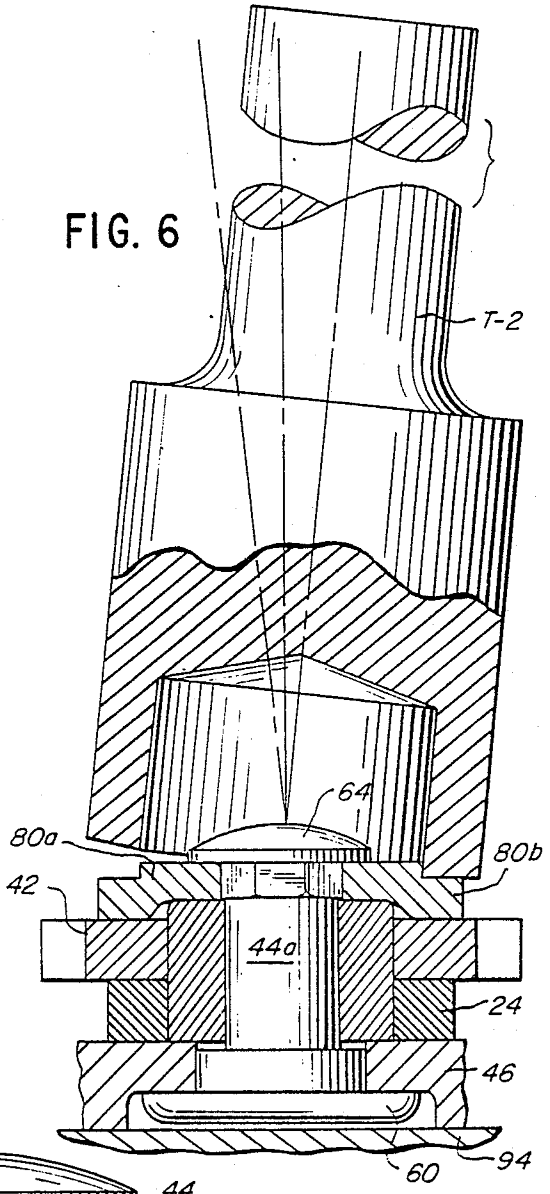
FIG. 6 is a view, similar to FIG. 5, showing a further step in the assembly method.

The method or assembling the components of the window operator is illustrated in FIGS. 3, 5 and 6. Initially, the round pivot pin is associated with the base 46 with the lower head 60 in the base recess 62 and with the stem 44*a* extending upwardly for placement of the bushing 68 thereon, followed by placement of the first arm 24 (carrying the gear 50 and second arm 30) and the gear 42 onto the bushing 68. The washer 80 is positioned on the stem 44*a* and against an upper end or the bushing 68 which extends beyond the upper face f the gear 42. At this stage, the components are as shown in FIG. 3. The components are positioned to have the lower head 60 of the pivot pin against a fixed reaction member R and a nutating riveting tool T-1, shown in vertical broken lines in FIG. 3, is brought into contact with the upper end of the pivot pin. The tool T-1 is a conventional spinning tool and is forced downwardly while nutating within limits indicated by broken lines 90 and 91 to form the upper head 64 for the pivot pin. The force is sufficient to have the formed upper head 64 tightly compress the washer 80 against the bushing 68 which abuts a face of the base 46 and force the upper part of the pivot pin stem 44*a* to conform to the opening in the washer 80. The components are then in the form shown in FIG. 5.

In the method step shown in FIGS. 5 and 6, and a spinning process is carried out to deform the washer 80. A nutating washer-forming tool T-2 having an annular end 96 is gradually forced downwardly against the washer 80 to force the annular end 96 against the outer annular part 80*b* of the washer. The tool T-2 nutates between limits indicated by broken lines 97 and 98, with one limit position being shown in FIG. 6. The spinning process is well known in the art whereby only a limited amount of the washer is contacted at any one time by the tool T-2 whereby a localized force required for deforming the washer is substantially less than the force required for a straight-line downward movement of the tool to deform the washer. The components are shown positioned for beginning washer deformation in FIG. 5, while complete deformation thereof is shown in FIG. 6 and the outer annular part of the washer 80 has been pressed tightly against the gear 42 whereby all tolerances are taken up because of the force being reacted against the fixed support 94.

After withdrawal of the tool T-2 the outer annular portion 80*b* of the washer 80 springs back due to elasticity of the washer and provides the desired amount of clearance.

Although not intended to limit the disclosure, an illustrative example of a window operator has the first arm 24 and gear 42 formed of sheet steel having a tolerance of 0.007". The washer 80 is also formed from material having the same tolerance and, as a result, unless a provision is made for controlled clearance there can be a total tolerance build up of 0.040–0.050". The washer 80 is formed from cold rolled 45–60 Rb sheet steel of 0.089"thickness and, after the deformation as described herein, the washer has sufficient elasticity whereby the outer annular portion springs back to provide a total clearance in the range of 0.003–0.004" which enables pivotal movement of the components with minimal axial play.

I claim:

1. A method of assembling pivotal components of a window operator comprising, assembling a pair of members on a bushing mounted on a pivot pin extending from a base and with a metal washer on the pivot pin adjacent an end thereof, compressing said washer against the bushing while at the same time forming a head on the end of the pivot pin, and thereafter force forming an annular outer part of the washer down around the bushing and against one of said members to take up all clearances between the base and said members, whereby after release of the forming force the elasticity of the washer enables spring-back of the annular outer part thereof to provide controlled clearance for pivoting of said 2. A method of mounting a member onto a pivot pin supported by a base with a controlled clearance between said member and base comprising, associating said pivot pin with said base with a head of said pivot pin interfitted with an opening in the base and a stem of the pivot extending upwardly from the base, mounting a bushing on said stem, mounting said member onto the bushing with the bushing extending beyond an upper surface of the member, mounting a metal washer on the stem and in engagement with the top of the bushing, forming a head on the upper end of the stem to hold the washer, bushing and base tightly together, and exerting compressive force on an outer annular area of the washer beyond the periphery of the bushing to deform said outer annular area downwardly into contact with the upper surface of said member whereby spring-back of the washer after removal of the compressive force provides the controlled clearance.

3. A method as defined in claim 2 wherein a pair of members are mounted onto said pivot pin with a second member positioned between said base and the member adjacent the washer.

4. A method as defined in claim 3 wherein said washer is formed of cold rolled steel.

5. A method as defined in claim 3 wherein said compressive force is applied to the outer annular area of the washer by a spinning operation.

* * * * *